(No Model.)  
H. H. BOYLE.  
PROCESS OF AND APPARATUS FOR TREATMENT OF RHEA GRASS OR SIMILAR FIBERS.  
No. 535,665. Patented Mar. 12, 1895.

11 Sheets—Sheet 1.

(No Model.)  
11 Sheets—Sheet 5.

H. H. BOYLE.
PROCESS OF AND APPARATUS FOR TREATMENT OF RHEA GRASS OR SIMILAR FIBERS.

No. 535,665.  
Patented Mar. 12, 1895.

Witnesses  
J. C. Wilson  
J. C. Gillis

Inventor  
H. H. Boyle  
by Whitman & Wilkinson  
Attys.

(No Model.)
H. H. BOYLE.
PROCESS OF AND APPARATUS FOR TREATMENT OF RHEA GRASS OR SIMILAR FIBERS.
No. 535,665. Patented Mar. 12, 1895.
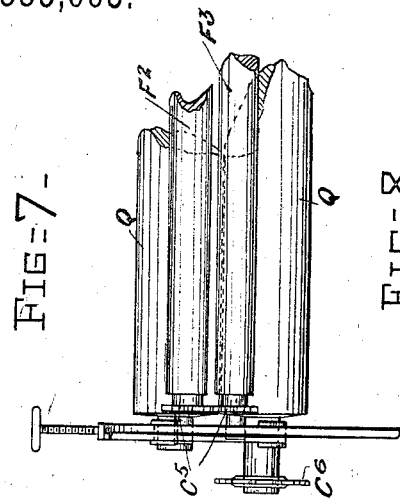
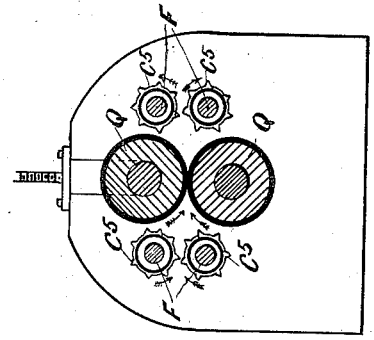
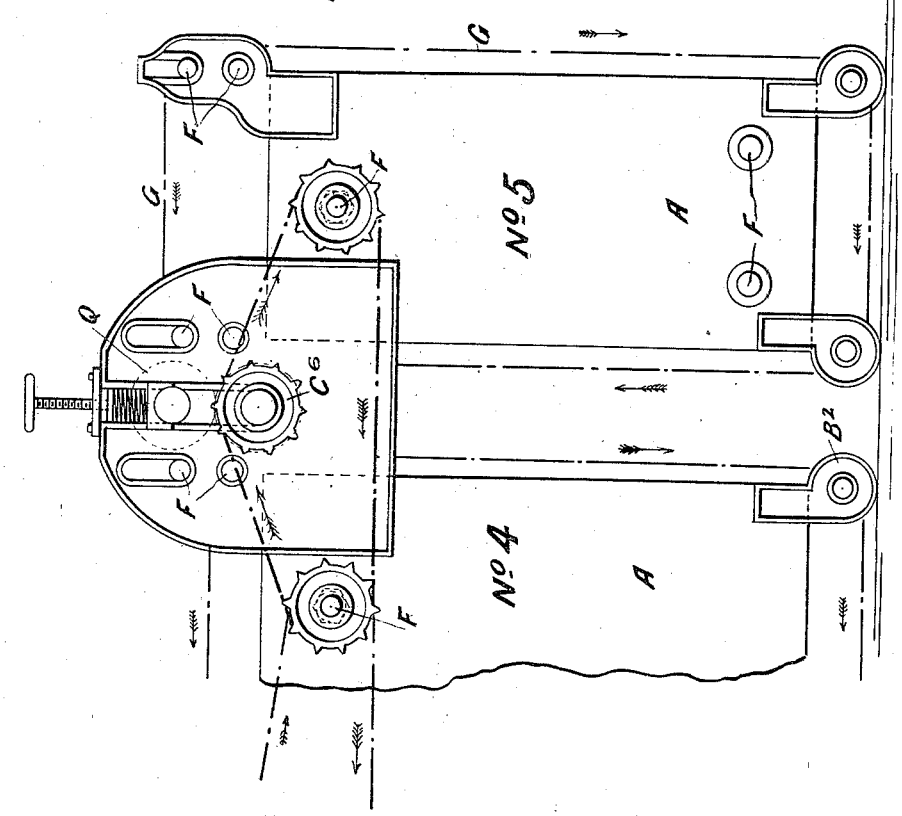

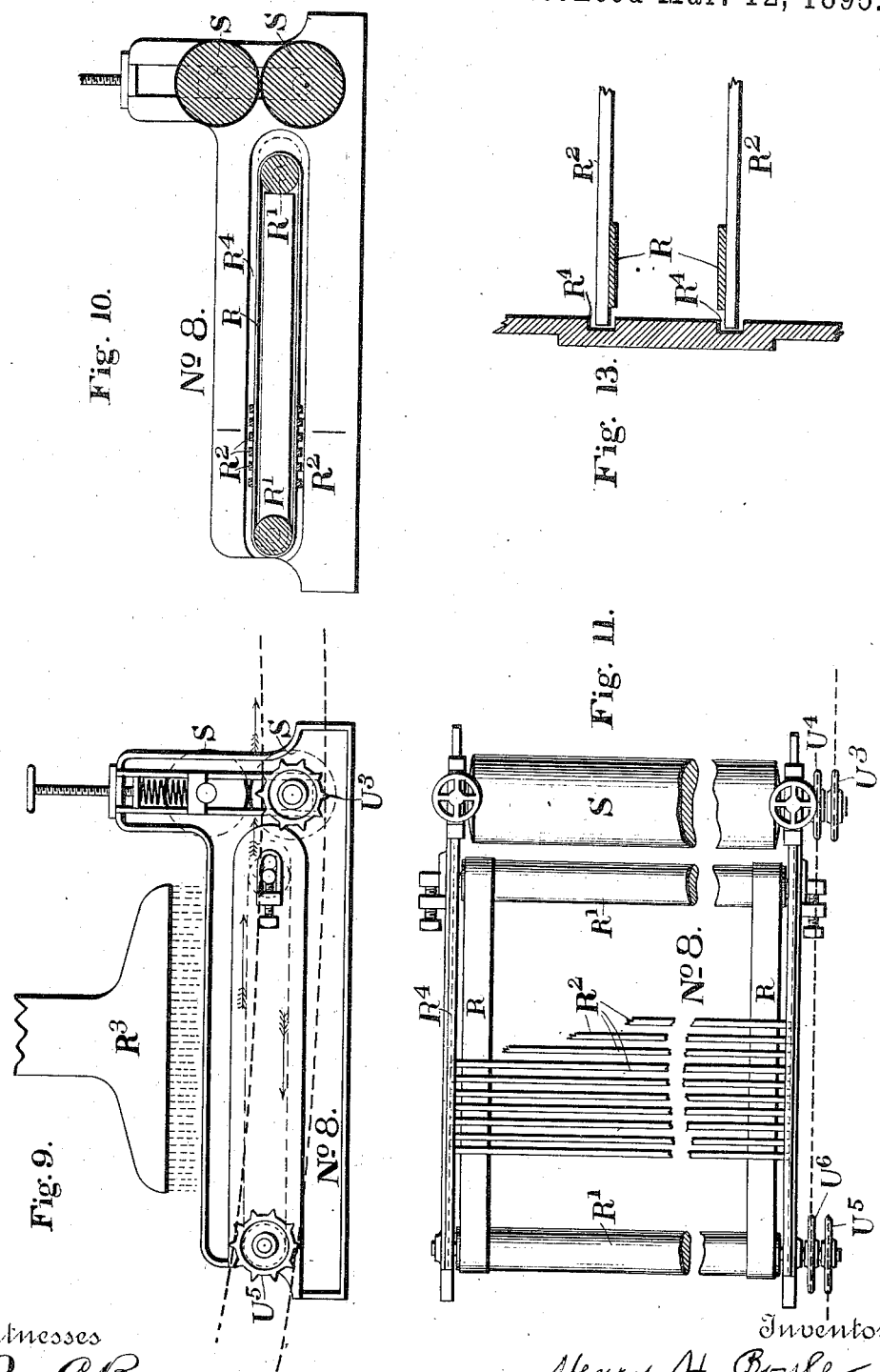

(No Model.) 11 Sheets—Sheet 8.
H. H. BOYLE.
PROCESS OF AND APPARATUS FOR TREATMENT OF RHEA GRASS OR SIMILAR FIBERS.
No. 535,665. Patented Mar. 12, 1895.
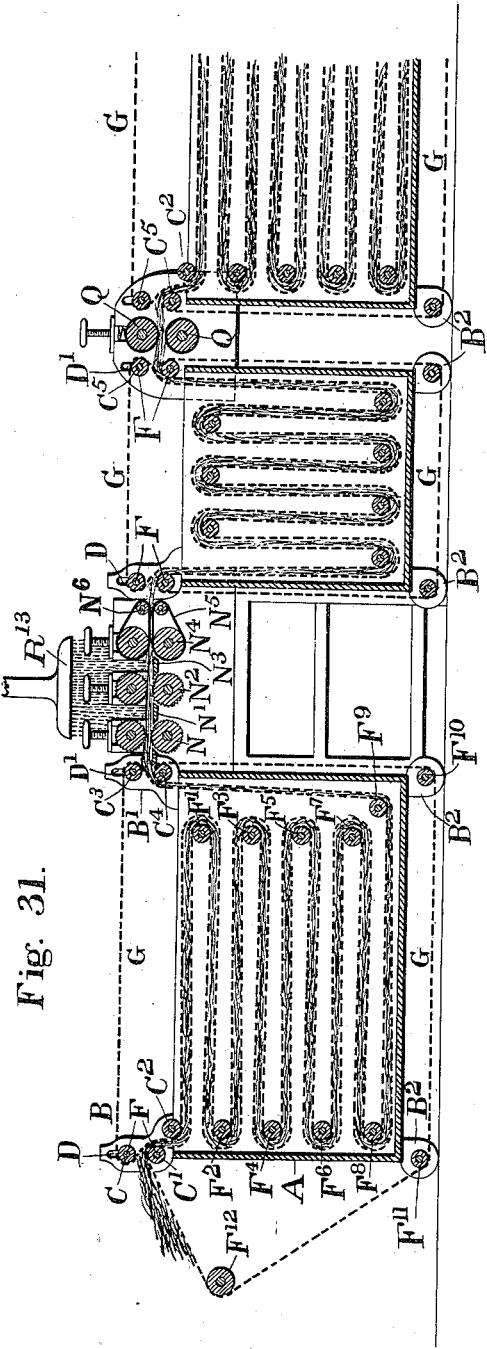
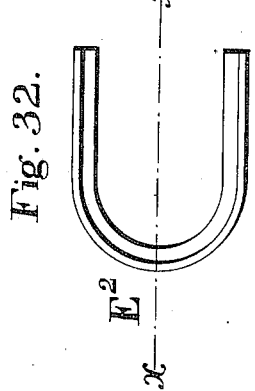
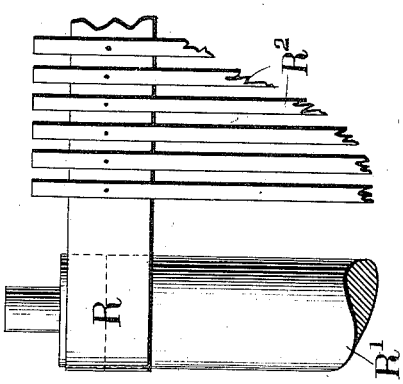
Witnesses
Percy C. Bowen
M. J. Sousa
Inventor
Henry H. Boyle
By Whitman & Wilkinson
Attorneys

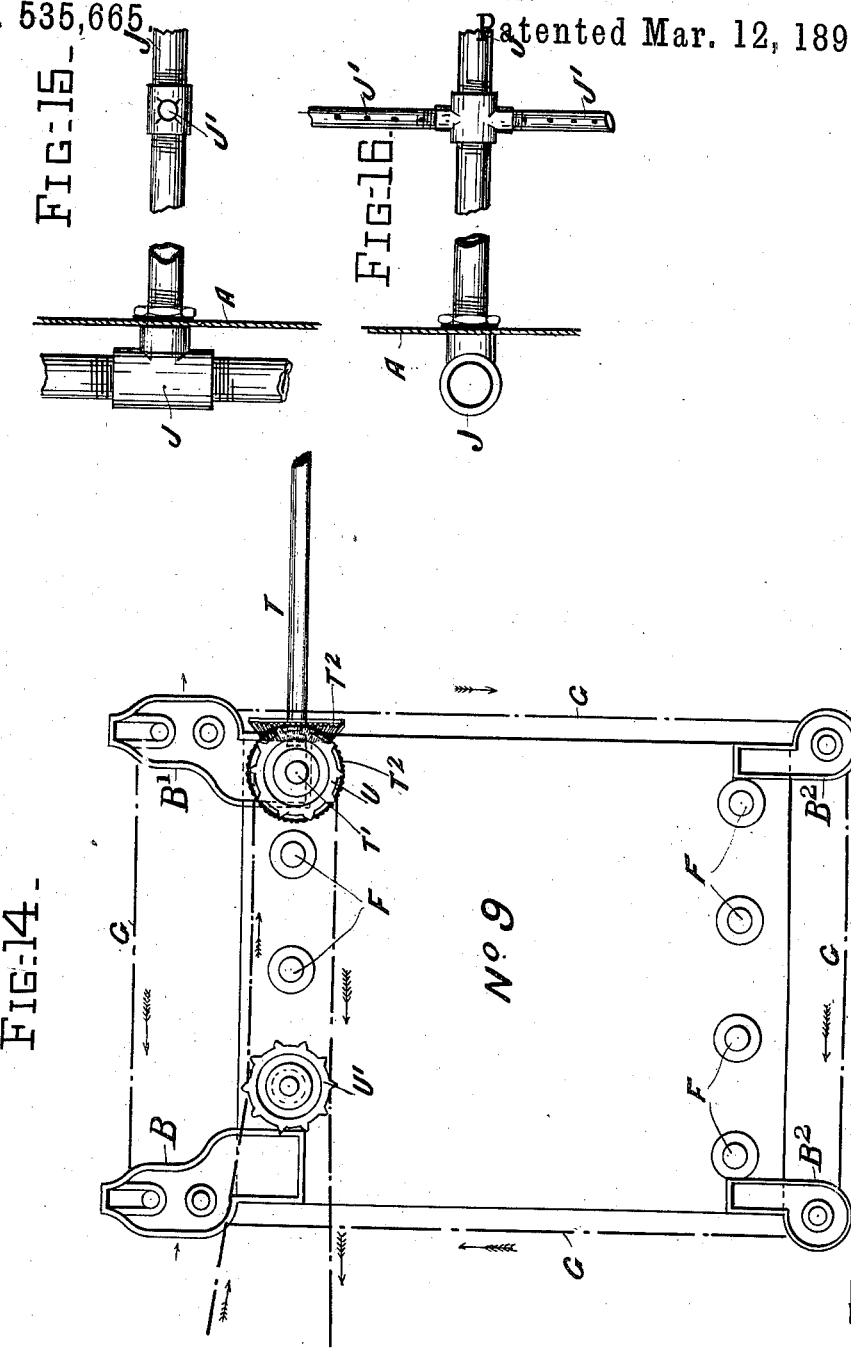
(No Model.)  
H. H. BOYLE.  
PROCESS OF AND APPARATUS FOR TREATMENT OF RHEA GRASS OR SIMILAR FIBERS.  
No. 535,665. Patented Mar. 12, 1895.
11 Sheets—Sheet 9.

(No Model.) 11 Sheets—Sheet 10.
H. H. BOYLE.
PROCESS OF AND APPARATUS FOR TREATMENT OF RHEA GRASS OR SIMILAR FIBERS.
No. 535,665. Patented Mar. 12, 1895.
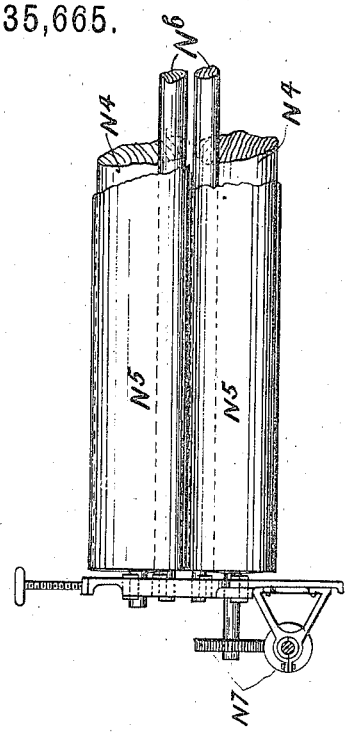
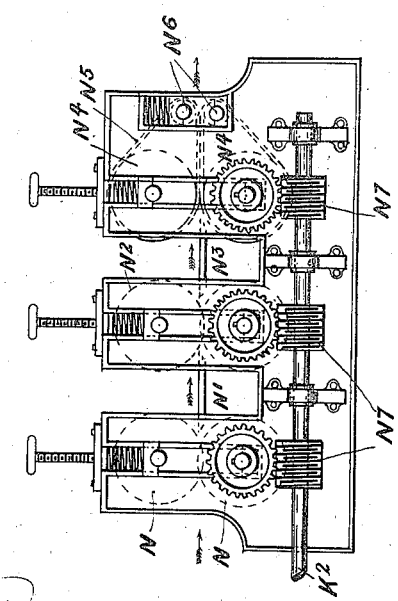
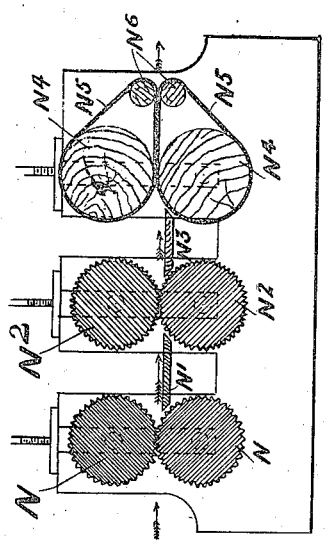

(No Model.)
11 Sheets—Sheet 11.

H. H. BOYLE.
PROCESS OF AND APPARATUS FOR TREATMENT OF RHEA GRASS OR SIMILAR FIBERS.

No. 535,665.
Patented Mar. 12, 1895.

Witnesses,
J. R. Wilson
H. M. Gillis

Inventor
H. H. Boyle
by Whitman & Wilkinson
Attys.

UNITED STATES PATENT OFFICE.

HENRY HUNGERFORD BOYLE, OF LONDON, ENGLAND.

PROCESS OF AND APPARATUS FOR TREATMENT OF RHEA GRASS AND SIMILAR FIBERS.

SPECIFICATION forming part of Letters Patent No. 535,665, dated March 12, 1895.

Application filed February 28, 1894. Renewed January 10, 1895. Serial No. 534,492. (No model.)

*To all whom it may concern:*

Be it known that I, HENRY HUNGERFORD BOYLE, a subject of the Queen of Great Britain, residing at London, England, have invented a certain new and useful Process of and Apparatus for the Treatment of Rhea Grass and Similar Fibers; and I do hereby declare the following to be a full, clear, and exact description of the invention, such as will enable others skilled in the art to which it appertains to make and use the same.

This invention relates to the treatment of rhea grass and similar raw fibers for the purposes of obtaining the fiber of same for commercial purposes.

To enable this invention to be fully understood I will proceed to describe the same with the aid of the accompanying drawings.

Figure 1:
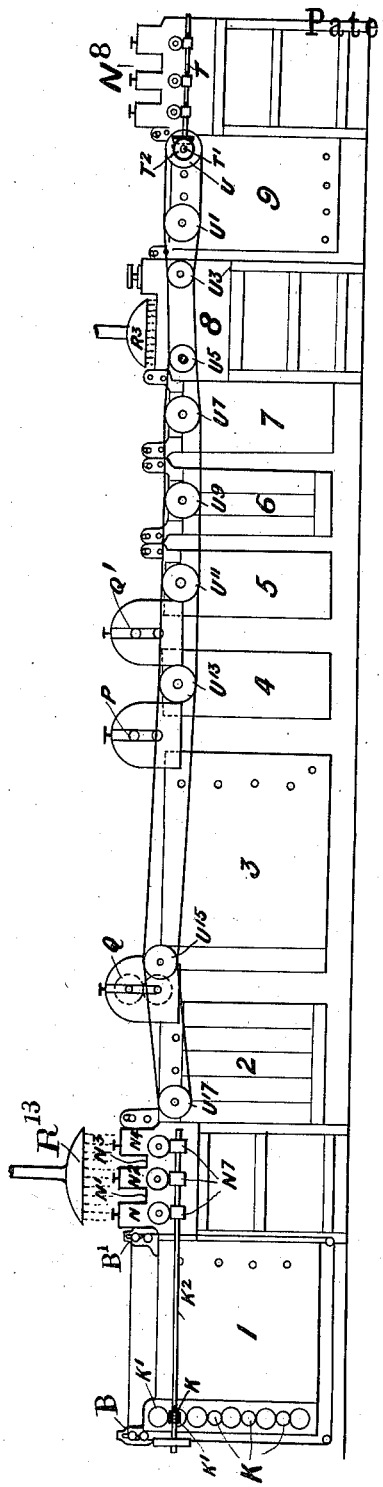
Figure 2:
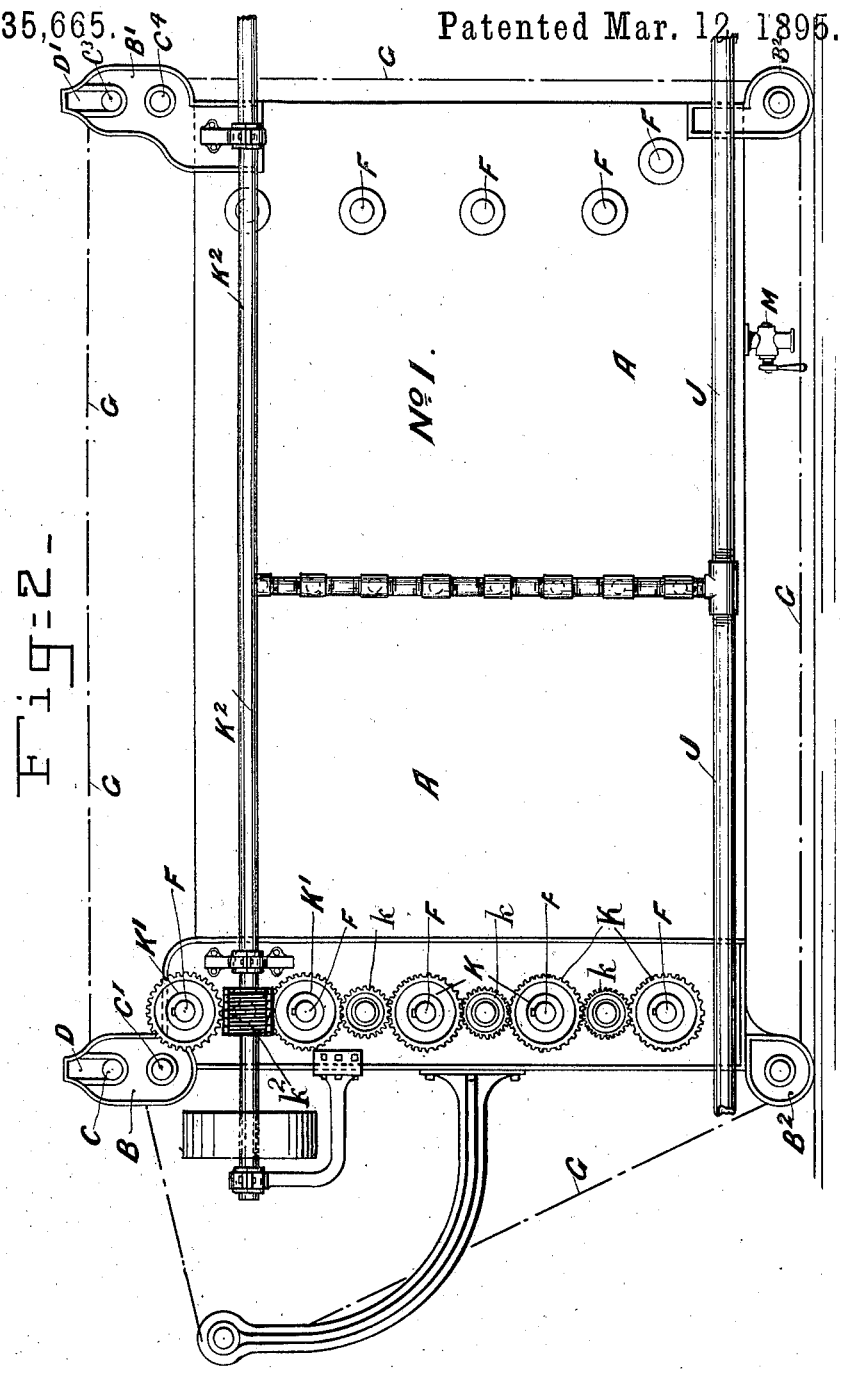
Figure 3:
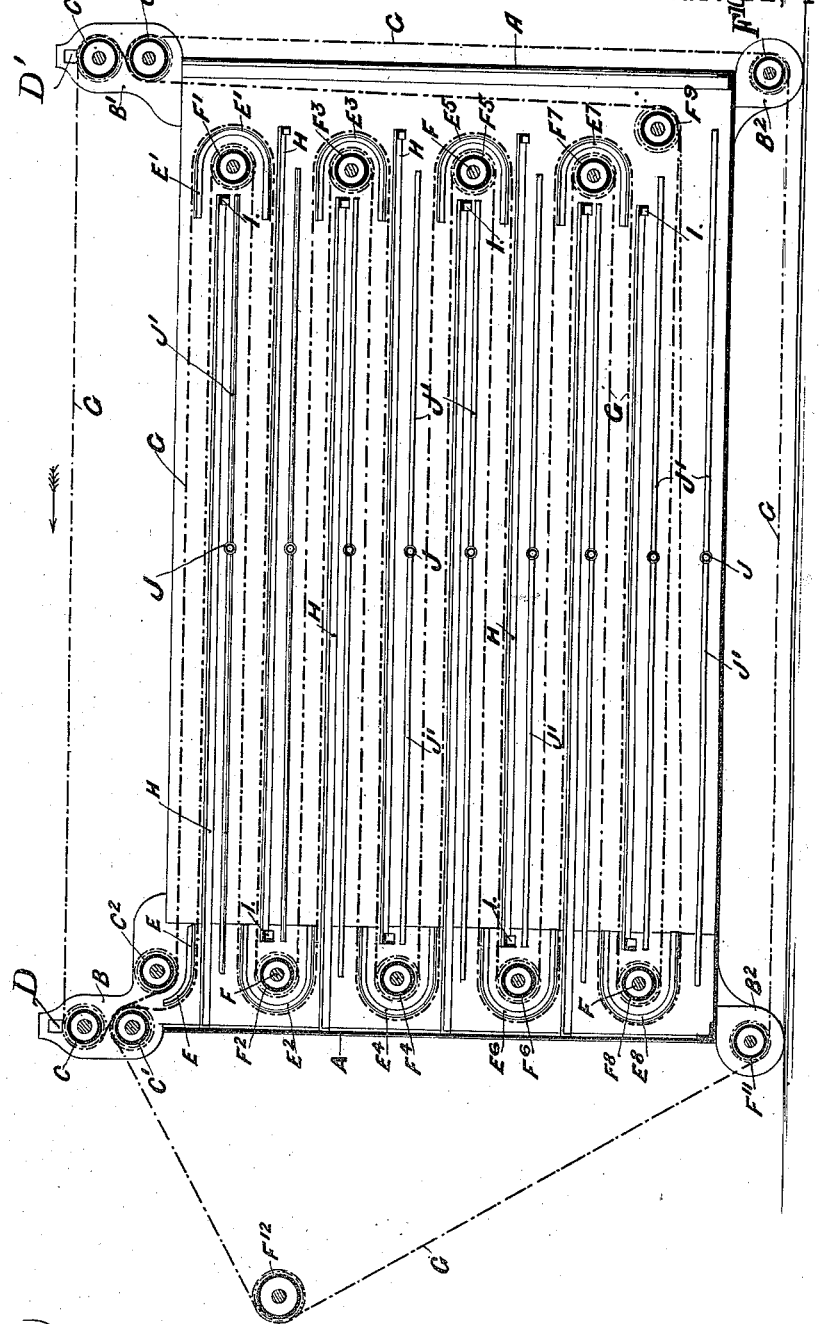
Figure 4:
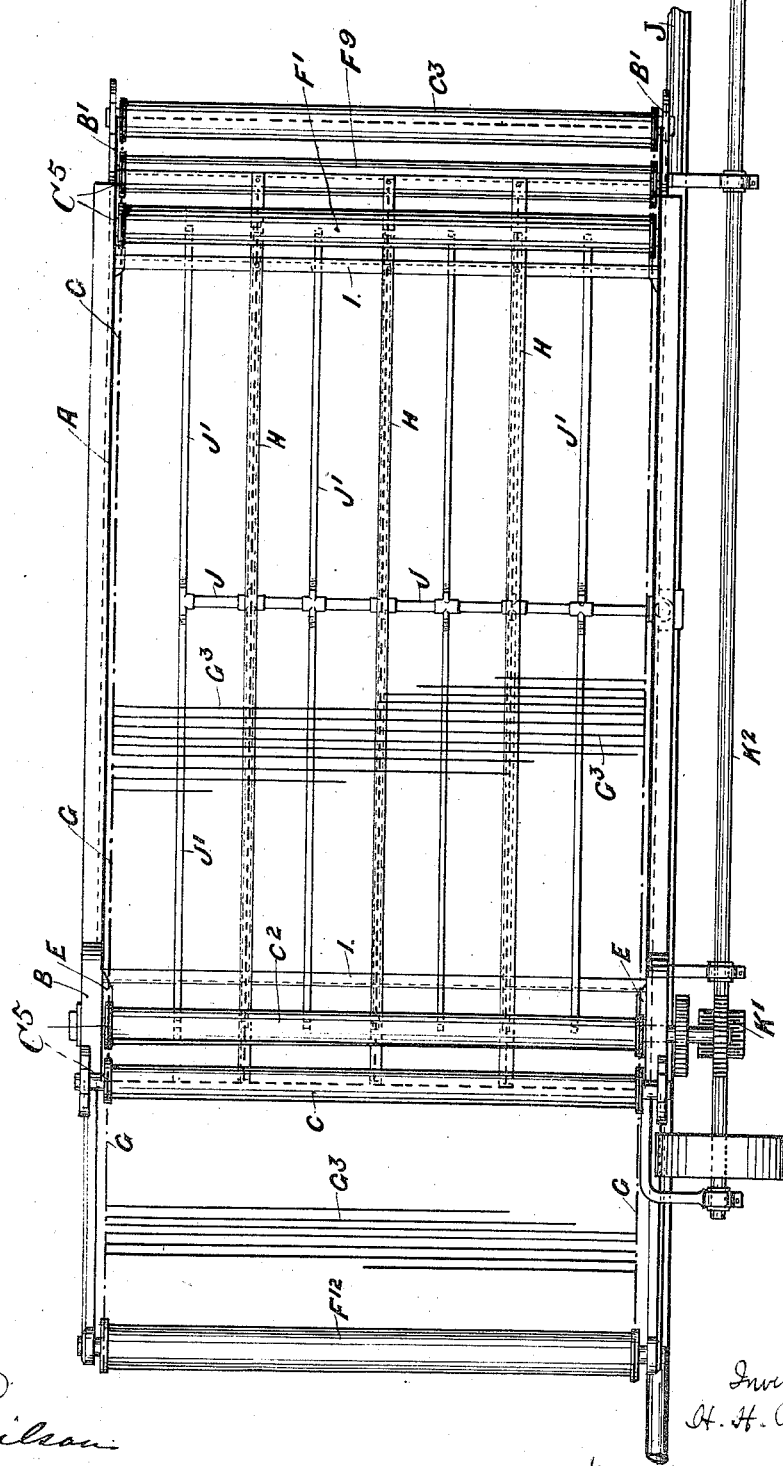
Figure 5:
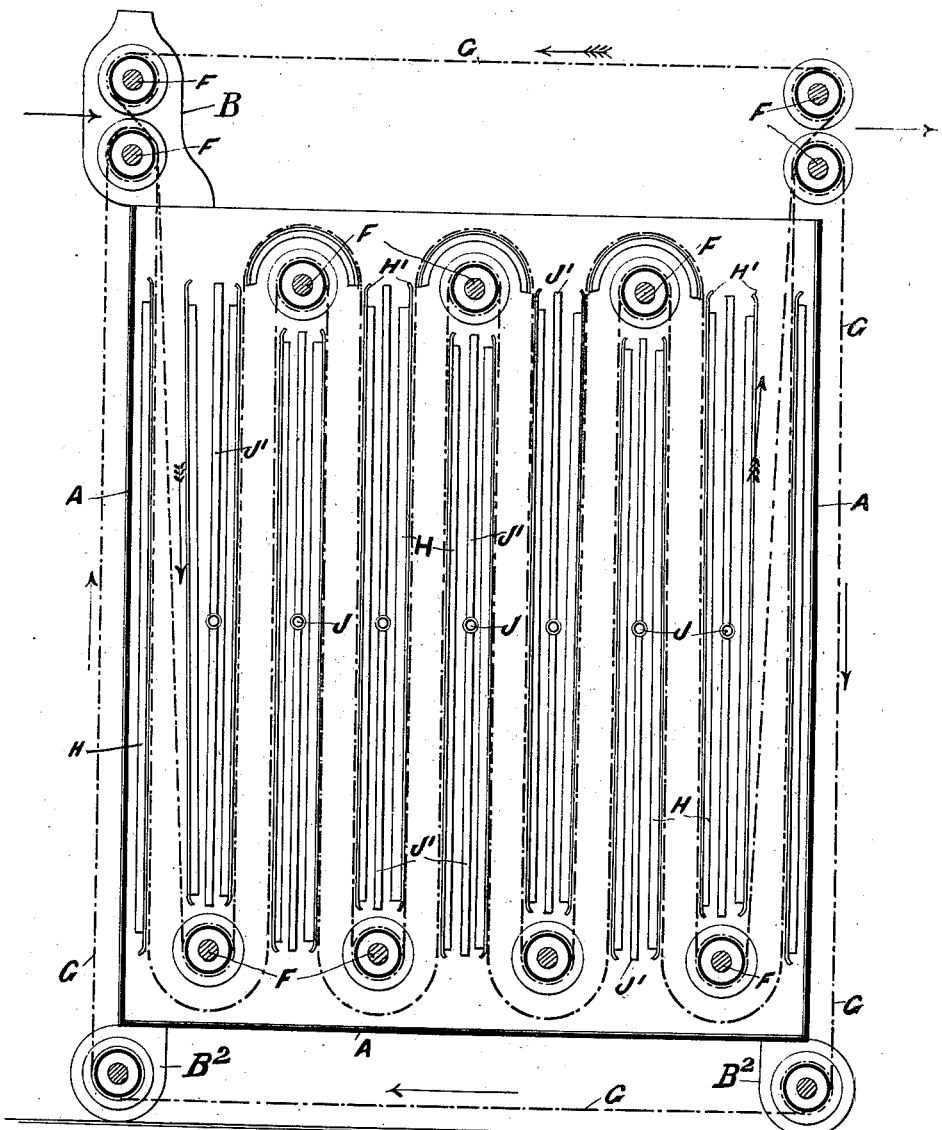
Figure 20:
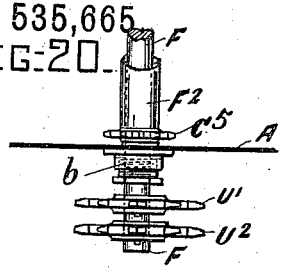
Figures 27, 28:
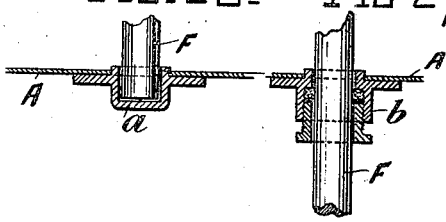
Figure 21:
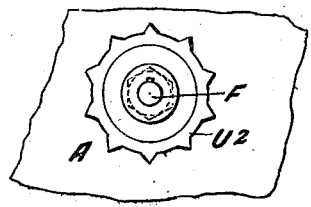
Figure 26:
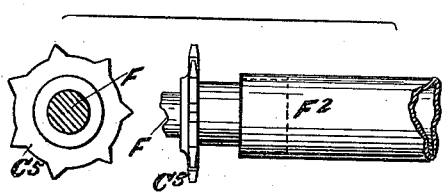
Figure 22:
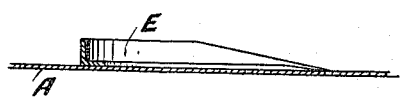
Figure 30:
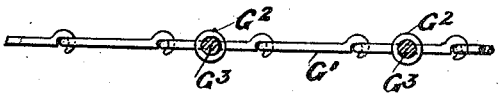
Figure 23:
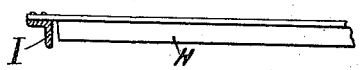
Figure 29:
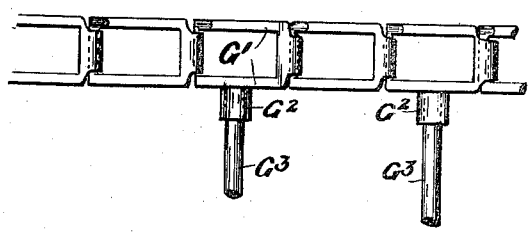
Figure 24:
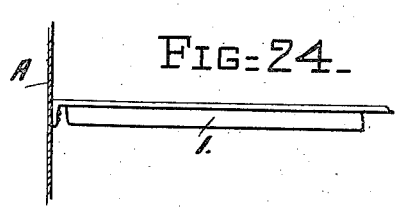
Figure 25:
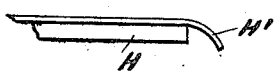

Figure 1 is a diagrammatic view in elevation, of the complete apparatus. Fig. 2 represents a side elevation on an enlarged scale, of one of the tanks in the apparatus and the attachments thereto, and represents especially the first tank, to which the third tank is generally similar. Fig. 3 represents a sectional side elevation of the tank shown in Fig. 2. Fig. 4 represents a plan view of the tank shown in Figs. 2 and 3. Fig. 5 represents a sectional side elevation of the last tank in the apparatus, which is substantially similar to all the other tanks except the first and third. Fig. 6 represents an outside elevation of two of the tanks in the apparatus and shows the means for driving the intermediate rollers and the inside traveling chains carrying the cross rods. Fig. 7 is a partial detached front view of rollers and carrying band embodied in Fig. 6. Fig. 8 represents a transverse section of the device shown in Fig. 7. Figs. 9 and 10 are side and sectional-side elevations, respectively, of the rinsing bath apparatus. Fig. 11 represents a plan of the device shown in Fig. 10. Figs. 12 and 13 are detail views on an enlarged scale showing the construction of the endless apron shown in Figs. 9 to 11. Fig. 14 represents an outside elevation of tank No. 9. Figs. 15 and 16 are detail views on an enlarged scale of the mode of securing steam pipes to side of tank. Fig. 17 represents a side elevation of a set of squeezing and pulling rollers. Fig. 18 represents a sectional elevation of the rollers shown in Fig. 17. Fig. 19 is a detail front view of one end of one set of rollers and carrying bands. Fig. 20 represents a plan view of the end of one of the roller shafts, showing the sprocket wheels inside and outside of the tank, and Fig. 21 is a view of the end of the shaft and sprocket outside of the tank. Fig. 22 represents a horizontal sectional view of the first end guide for the chains. Fig. 23 is an elevation of one of the guides for the rods, and Fig. 24 is a similar view of one of the angle iron supports for holding the guides. Fig. 25 is a detail view of one end of the guides as used in the vertical position as shown in Fig. 5. Fig. 26 is a side and end view of one end of one of the roller shafts showing the roller and sprocket wheel inside of the tank. Fig. 27 is a sectional view of the packing box for one end of the roller shaft where it passes through the side of the tank, and Fig. 28 is a similar view of the socket in the side of the tank for the other end of the roller shaft. Fig. 29 is a plan view of a portion of the chain for carrying the traveling rods; and Fig. 30 is a side view of the chain shown in Fig. 29. Fig. 31 is a sectional view of three of the tanks and the squeezing and pulling rollers situated between them, showing how the rhea grass is carried from one part of the machine to the other. Fig. 32 is an elevation of one of the semicircular guides for the sprocket chains and rods at the ends of the tanks, and Fig. 33 is a sectional view of the same on the line *x x* of Fig. 32.

The apparatus consists of a number of tanks numbered for convenience of reference, 1, 2, 3, 4, 5, 6, 7, 9; and a rinser 8, and various parts connected to the different tanks as will be hereinafter explained.

According to this invention the grass is subjected to the following operations:—First, it is boiled in a tank (No. 1) in a special solution and acted upon by steam; after which it passes between sets of rollers. The first set squeeze it to break and loosen the bark which has become softened by the boiling, and action of the steam. From this set it passes between another set which travel at a higher surface speed than the first set. This operation further loosens and breaks the bark, and somewhat separates the fibers, and as this second set of rollers travel at a higher surface speed than the first set, they pull out the grass while it is held by the first set. The grass then passes from the second set of rollers to a third set of rollers, which further squeeze and pull out the grass. From these last rollers the grass passes through an acid solution in tank No. 2, which solution acts upon the fibers to further loosen and separate them. From this tank the grass passes between squeezing rollers, and from these rollers into a tank No. 3, similar to tank No. 1, and is again boiled in the same way. From this tank the grass passes between squeezing rollers, and into another tank No. 4, containing a special solution. From this tank the grass passes between squeezing rollers and into another tank No. 5, containing a special solution. From this tank the grass passes into another tank No. 6, containing a special solution. From this tank the grass passes into another tank No. 7, containing a special solution; from which it passes between squeezing rollers. From these rollers it is delivered into a rinsing bath No. 8, to get rid of the pieces of separated fiber and other impurities, which are washed away by a douche. From this bath the grass passes between squeezing rollers and into another tank No. 9, containing a softening solution of a saponaceous character. From this solution the grass passes between three sets of rollers to squeeze and pull out the grass; when it is delivered on to a table, and after drying the fibers are sufficiently loose to be capable of being fully separated by combing in the usual way. The whole of these operations are continuous, the raw material being fed in at the beginning of the apparatus through which it travels meeting with the various operations described in its course. The grass is carried through the whole of the tanks between two rows of rods attached to endless chains arranged to travel through the tanks preferably in a serpentine course.

Referring to Figs. 2 and 3, A illustrates the metal shell of the tank No. 1, which is fitted at top with brackets B and B', and at bottom with feet $B^2$. The brackets B carry the rollers C, C' and $C^2$, and brackets B', the rollers $C^3$ and $C^4$. The journal ends of the spindles of the rollers C and $C^3$ are held in the slots D and D', to enable such rollers to lift when required as hereinafter explained. The sprocket guide wheels or other rollers, for the chain carriers inside of the tanks are marked $C^5$. All the spindles of the sprocket wheels are marked F. The interior of the tank is fitted with bent-round guides E, E', $E^2$, $E^3$, $E^4$, $E^5$, $E^6$, $E^7$, $E^8$, having their ends inclined off toward side of tank. (See Figs. 22, 32, and 33.) Passing across the inside of the tank and coming within the guides are the spindles F. One end of these spindles is held in a socket $a$ inside of the tank, (see Fig. 28) and the other end of the spindle passes through the side of the tank and is made water-tight by a stuffing box $b$. (See Fig. 27.) These spindles are fitted within the tank near each side with sprocket wheels $C^5$ to engage a traveling endless chain. Each spindle F, has a roller upon it as a guide for the endless chain as hereinafter explained. These chain rollers are marked $F^2$, $F^3$, $F^4$, $F^5$, $F^6$, $F^7$, $F^8$; the object of them being clearly shown in Figs. 3 and 5.

G designates two endless chains passing in a serpentine course through the tank, one pair of chains on each side of the tank. The chains enter over rollers C and C', the top chains passing around roller C and under roller $C^2$, across the tank, around guide E', back to roller $F^2$, back to guide $E^3$, back to roller $F^4$, back to guide $E^5$, back to roller $F^6$, back to guide $E^7$, back to roller $F^8$, back to roller $F^9$, up the tank at the back, around the roller $C^3$, back over the top of the tank, around the roller C, and again into the tank. The other chains enter over the roller C', passing under guide E, back to roller F', back to guide $E^2$, back to roller $F^3$, back to guide $E^4$, back to roller $F^5$, back to guide $E^6$, back to roller $F^7$, back to guide $F^8$, back to roller $F^9$, up the back of tank around roller $C^4$, down the back of outside of tank, around roller $F^{10}$, along under the bottom of the tank under roller $f^{11}$, up around roller $F^{12}$, and again enters tank over roller C'. By following these movements of the two chains through the tank, it will be observed that the two chains enter the tank together, then separate the distance between the rollers and guides in traveling through the tank, then come together again when passing around roller $F^9$, travel together up the back of inside of tank and separate again at the outside of rollers $C^8$ $C^4$. The chains are formed of links G', (Figs. 29 and 30,) fitted with lateral sockets $G^2$, to carry rods $G^3$, which extend across the tank. Between these two sets of rods the grass is carried through the tank.

By feeding the grass or other raw material upon the rods and chains at the entrance of the rollers C, C', the closing together of the chains and rods draws the material in, and so carries it through the tank in serpentine course of the chains, and on the chains opening in coming out of the tank, while passing around rollers $C^3$, $C^4$, the material is released. To meet any block of grass, the axles of the rollers C and $C^3$ are carried in slots D, D', which allows the rollers to lift. The same slot bearings are used for the bearing ends of the axles of the corresponding rollers in the different tanks. To prevent the weight of the rods sagging the chains while passing through the tank, a number of guides H are secured longitudinally in the tank for the rods to bear upon. These guides are preferably formed of T iron, and supported by cross stays I of angle iron. In Fig. 5, they act as vertical guides and have their ends turned inwardly as at H', Fig. 25. Arranged to come between each pair of chain rods is a perforated steam pipe J, with lateral branches J', for the double purpose of boiling the solution in the tank and to enable the steam to act upon the grass while being carried through the solution. The ends of the shafts F of the rollers C² and F² which extend through one side of the tank are provided with worm wheels K' and the same ends of the shafts of the rollers F⁴, F⁶ and F⁸ are provided with gear wheels K. A shaft K² on which is mounted a worm k² is journaled on the side of the tank so that the said worm k² will be between the worm wheels K' and mesh with each of them. An idle pinion k is mounted on a spindle between and meshes with each of the gear wheels K.

The shaft K² may be driven from any suitable source of power, and when set in motion will turn the whole train of gearing just described, as will be readily understood.

The construction and fittings of tanks Nos. 1 and 3, are the same. The solution used in each of these tanks is a weak one of caustic soda, or its chemical equivalent.

When the grass is delivered from the traveling rods at the outside of rollers C³, C⁴, it is caught by fluted rollers N, (Figs. 17 and 18) to crush the bark and partly open the fibers. From these rolls the grass passes beneath the sprinkler R¹³, and is received on to a guide N', which conducts it to a second pair of rolls N², which travel at a higher surface speed than the first set N. These second rolls N², further break up the bark and further loosen the fibers, and pull the same out straight owing to it being held by the first rolls. From the second rolls the grass is delivered on to the guides N³, which conducts it to a third set of rolls N⁴, which squeeze and loosen the fibers. These rolls are preferred to travel at the same surface speed as rolls N².

Passing around rolls N⁴ are india rubber bands N⁵, which also pass around smaller rollers N⁶. These bands carry the grass from the rollers N⁴, and deliver it between traveling rods and chains as before described, of the next tank No. 2, Fig. 5. These chains and rods travel through this tank in serpentine course as in tanks Nos. 1 and 3, but with the difference of traveling vertically instead of horizontally, the internal fittings being arranged vertically. In this arrangement no circular guide is required at bottom of tank for the outer layer of the rods and chains G. The solution used in this tank is a weak one of hydrochloric acid. From this tank (No. 2) the grass is delivered from the chains and rods between another set of squeezing rolls Q (Figs. 8 and 31) which pass it to be caught in the traveling chains and rods of tank No. 3, through which it is carried as described for tank No. 1. From tank No. 3 the grass is delivered into the squeezing rolls P, Fig. 1, between tanks Nos. 3 and 4. From these rolls it passes between the vertically traveling chains and rods through tank No. 4. In this tank the solution is a weak one of permanganate of potash. From this tank the grass is delivered from the traveling chains and rods between another set of squeezing rolls Q', which deliver it into the chains and rods of tank No. 5, through which it is carried as before described. The solution in this tank is a weak solution of hyposulphite of soda and hydrochloric acid. From the chains and rods of this tank the grass is delivered to the chains and rods of the next one (No. 6) through which it is carried as before. In this tank is a solution of hydrochloric acid. From this tank the grass is delivered to the chains and rods of the next tank No. 7, through which it is carried as before. In this tank is a solution of hyposulphite of soda. From this tank the grass is delivered on to an endless apron consisting of traveling bands R, moving on drums R' with cross laths R² arranged over which is a douche R³, (Figs. 9, 10, and 11) for washing the grass of impurities. From this washing band or rinser (Fig. 9) the grass is passed between squeezing rollers S, from whence it passes to the traveling chains and rods of the tank No. 9, through which it is carried as before. In this tank is a softening solution of a saponaneous character. The grass on delivery from this tank passes between a second set N⁸ of three rollers similar to that shown in Figs. 17 and 18, acting as before described. From these rollers the grass is delivered on to a table and after drying is ready for combing or other treatment, to fit it for commercial purposes.

The revolving parts connected with the various tanks, other than tank No. 1, are driven from shaft T, revolving shaft T', by bevel gearing T². Upon this shaft T' is a pulley wheel U to engage by endless chains, the wheels U', U², U³, U⁴, U⁵, U⁶, U⁷, U⁸, U⁹, U¹⁰, U¹¹, U¹², of the axles of the sprocket wheels of the different tanks to operate the traveling chains.

Referring to Figs. 9, 10, 11, and 13, the ends of the cross laths R², work in a guide R⁴, consisting of a groove or channel formed in the sides of the casing. When treating green or tender fibers, the tanks Nos. 2 and 3 and also the set of rollers between tanks Nos. 1 and 2, can be dispensed with, so that the raw material passes from tank No. 1 to the rolls P, to tank No. 4 direct.

Having now particularly described my invention, what I desire to claim is—

1. The herein described process for the treatment of rhea grass, which consists in saturating the grass in an alkaline solution, in crushing and removing excess of moisture from the wet grass and loosening the fibers, in saturating the treated material in a weak solution of hydrochloric acid, removing excess of moisture from the same, then passing it again through an alkaline solution, then removing excess of moisture from it and passing it through a weak solution of permanganate of potash; again removing excess of moisture from the same, and then saturating it in a weak solution of hyposulphite of soda and hydrochloric acid; again removing excess of moisture from the same, and then saturating it in a weak solution of hydrochloric acid;

again removing excess of moisture from the material and saturating it in hyposulphite of soda; then washing the treated material and saturating the same in a saponaceous solution, and finally removing excess of moisture from the same for the subsequent mechanical treatment, substantially as and for the purposes described.

2. The herein described process for the treatment of rhea grass which consists in passing the grass through an alkaline solution, in crushing the same and exposing the fiber, and in then treating the same with weak solutions of hydrochloric acid, caustic soda, permanganate of potash, and hyposulphite of soda, and in finally washing and drying the same, substantially as and for the purposes described.

3. The herein described process for the treatment of rhea grass which consists in passing the grass through an alkaline solution, in crushing the same and exposing the fiber, and in then treating the same with weak solutions of hydrochloric acid, caustic soda, permanganate of potash, and hyposulphite of soda, in washing the same, in treating the washed material with a saponaceous solution, and in finally drying the treated material, substantially as and for the purposes described.

4. The herein described process for the treatment of rhea grass which consists in passing the grass through a heated alkaline solution, in crushing the same and exposing the fiber, and in then treating the same with weak heated solutions of hydrochloric acid, caustic soda, permanganate of potash, and hyposulphite of soda, and in finally washing and drying the same, substantially as and for the purposes described.

5. The herein described process for the treatment of rhea grass which consists in passing the grass through a weak heated solution of caustic soda, in crushing the same and exposing the fiber, and in then treating the same with weak heated solutions of hydrochloric acid, caustic soda, permanganate of potash, and hyposulphite of soda, in washing the same, in treating the washed material with a saponaceous solution, and in finally drying the treated material, substantially as and for the purposes described.

6. In an apparatus of the character described, the combination with a tank partly filled with liquid, and drums mounted therein, curved guides concentric with said drums, and pairs of longitudinal guides connecting said curved guides and extending between said drums at a given distance from each other; of two endless aprons traveling over the said drums and guides and holding the fibrous material between them, and means for feeding the fibrous material at one end of said tank and for carrying it off from the other end thereof, substantially as and for the purposes described.

7. In an apparatus of the character described, the combination with a tank partly filled with liquid and drums mounted therein, curved guides concentric with said drums and pairs of longitudinal guides extending between said curved guides and between said drums at a given distance from each other; of two endless aprons traveling over the said drums and guides and holding the fibrous material between them, the said aprons coming together just before entering the said tank and opening apart just after leaving the same for the purpose of nipping and drawing in and then later of discharging the fibrous material, substantially as and for the purposes described.

8. In an apparatus of the character described, the combination with a tank provided with winding guides on the interior thereof and partly filled with liquid, of two endless aprons traveling over the said guides and holding the fibrous material at one end of the said tank, and for carrying off the fibrous material from the other end thereof, and steam pipes having perforated branches extending between the layers of fibrous material carried by the said double aprons, substantially as and for the purposes described.

9. In an apparatus of the character described, the combination with a tank partly filled with liquid, and drums mounted therein, curved guides concentric with said drums, and pairs of longitudinal guides connecting said curved guides and extending between said drums at a given distance from each other; of two endless aprons traveling over the said drums and guides and holding the fibrous material at one end of said tank and for carrying it off from the other end thereof, and steam pipes having perforated branches extending between the layers of fibrous material carried by the said double aprons, substantially as and for the purposes described.

10. In an apparatus of the character described, the combination with a tank partly filled with liquid and drums mounted therein, curved guides concentric with said drums and pairs of longitudinal guides extending between said curved guides and between said drums at a given distance from each other; of two endless aprons traveling over the said drums and guides and holding the fibrous material between them, the said aprons coming together just before entering the said tank and opening apart just after leaving the same for the purpose of nipping and drawing in and then later of discharging the fibrous material, and steam pipes having perforated branches extending between the layers of fibrous material carried by the said double aprons, substantially as and for the purposes described.

HENRY HUNGERFORD BOYLE.

Witnesses:
FREDERIC PRINCE,
WILLIAM MUIR.